United States Patent Office 2,716,894
Patented Sept. 6, 1955

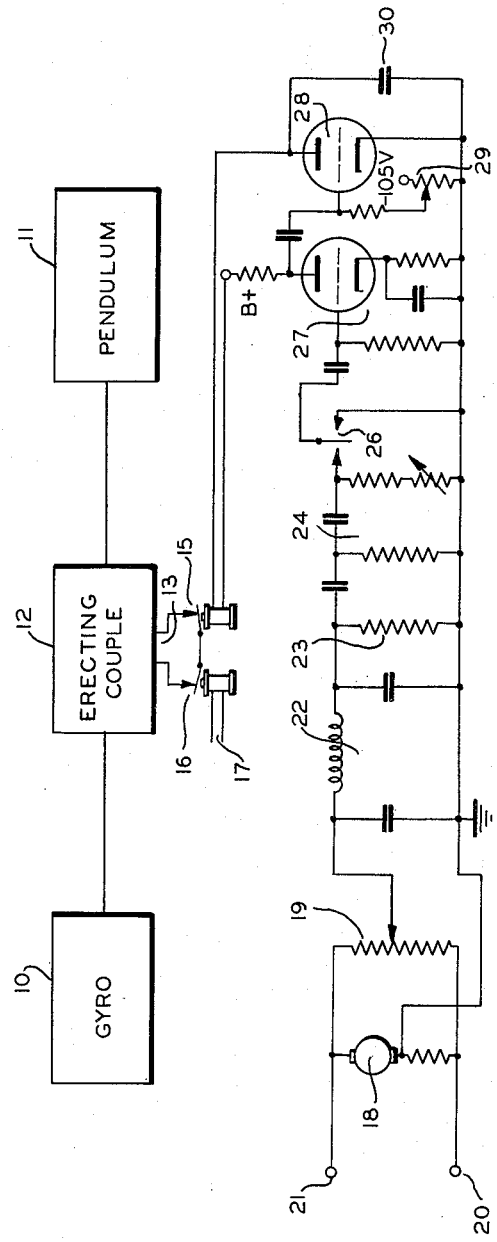

2,716,894

ROLL AND PITCH ACCELERATION DETECTOR

Nathaniel B. Nichols, Cambridge, and Clinton H. Rider, Boston, Mass., assignors, by mesne assignments, to the United States of America as represented by the Secretary of the Navy Application November 30, 1945, Serial No. 631,945

3 Claims. (Cl. 74—5.41)

This invention relates to roll and pitch acceleration detectors and particularly to such detectors when used to control the erecting couple between a gyro stable element and its gravity reference, in response to the acceleration of the angular motions, both roll and pitch, of a vessel.

All gyro stable elements or stable verticals depend on the force of gravity for determination of the true vertical. Such devices may be considered to consist essentially of a gimbal-supported pendulum and a gyro, which is added to damp out the oscillations to which the pendulum is subject. Usually the gyro is mounted non-pendulously in a separate gimbal system and is erected to the vertical by one of several types of electrical or mechanical coupling which is known as an erecting couple and which tends to pull the bottom of the gyro axis into alignment with the pendulum. Often the pendulous system is subject to short period oscillations and the non-pendulous gyro system holds closely to the average or mean position of the pendulum by virtue of the coupling force.

On ship borne stable elements this method would lose accuracy if the ship picks up or drops speed for any considerable period or if the ship goes into a protracted turn. The would-be adverse effect of these accelerations is usually avoided by utilizing detectors sensitive to changes in ship speed and course. These detectors serve to cut out the erecting couple between the pendulous system and the gyro system during excessive accelerations, allowing the accelerations to deflect the pendulum average position from the vertical without dragging the gyro system into the same error.

Lateral movement due to roll and fore and aft movement due to pitch have heretofore been ignored, since stable elements have usually been located near the metacenter of the ship where such motions are too slight to be of consequence. However, it has recently become necessary on certain classes of ships to place auxiliary stable elements at points substantially removed from the metacenter such as high in the mast structure.

Accordingly, it is a principal object of this invention to provide a roll and pitch detector which controls the erecting couple in a gyro stable element to disconnect the erecting couple when the roll or pitch acceleration exceeds a predetermined value and to reconnect the erecting couple when the accelerations return to these values.

Other and further objects will be apparent upon consideration of the following description together with the accompanying drawing, where the sole figure generally represents a circuit diagram of an embodiment of the invention.

In the drawing, a gyro stable element is shown as comprising a gyro 10, a pendulum 11, and an erecting couple 12 therebetween. The erecting system includes circuit 13 having the relay switches of relays 15 and 16 in series therewith to deactivate the erecting couple when the current in the coil of either relay 15 or 16 passes beyond a predetermined value and to reactivate the erecting couple when the current returns to this value. This cut-out circuit controls the erection magnet current in an eddy-current type of erection system, or the flow of mercury in a mercury erecting system.

In order to have the relays operate properly, it is necessary that the magnitudes of the currents passing therethrough be dependent on the acceleration of the roll and pitch, and circuits are provided to control these currents. One of these circuits is shown as connected in the coil circuit of relay 15 to control the erecting couple in accordance with the roll acceleration, it being understood that a second and similar circuit is connected in the coil circuit 17 of relay 16 to control the erecting couple in accordance with the pitch. The input to the disclosed circuit is taken through potentiometer 19 from either the armature of the roll follow up motor 18 supplied at terminals 20 and 21 or from a tachometer generator driven by the motor where an alternating voltage exists due to the back electromotive force in the armature or tachometer whose magnitude is proportional to angular velocity of the roll and whose period is equal to the period of the roll. It is understood that a second and undisclosed circuit has its input taken from the armature of the pitch follow up motor or from a tachometer generator driven from the motor, where an alternating voltage exists whose magnitude is proportional to the angular velocity of the pitch and whose period is equal to the period of the pitch.

A low pass filter at 22 is provided for smoothing this alternating voltage to eliminate higher harmonics of the roll frequency. The output from the filter is applied across resistor 23 and the voltage thereacross differentiated by a differentiating circuit at 24 to furnish an output voltage depending on the rate of change of the angular velocity of the roll, that is, the acceleration. A vibrator 26 is driven at a rate in the order of 60 cycles per second, and thus converts the differentiated voltage to an alternating voltage whose frequency is that of the vibrator and whose amplitude from peak to peak is that of the differentiated voltage. This alternating voltage is amplified in a conventional amplifier circuit 27, and then applied to the grid of an electron tube 28. This grid is biased to cut-off by means of potentiometer 29 with a negative voltage applied thereto. Accordingly, the plate circuit of tube 28 and the coil of relay 15 will carry a current whose amplitude is dependent on the differentiated voltage from differentiating circuit 24, which is in turn dependent on the acceleration of the roll and the potentiometer 29. A condenser 30 is added to smooth the current in the relay coil. This current in the relay coil when it exceeds a magnitude predetermined by adjustments common to current relays will operate the relay switch to disconnect the erecting couple in the gyro stable element. When the current returns to this predetermined magnitude the relay switch operates to once more connect the erecting couple. Likewise relay 16 disconnects the erecting couple when the pitch acceleration exceeds a predetermined magnitude and reconnects the erecting couple when the acceleration returns to this magnitude.

It is to be understood that either a pitch or roll detector may be used alone, when it is permissible to disregard the effect of roll or pitch, respectively. It is to be further understood that the invention is not restricted to water craft, but that the term "vessel" as used is intended to include aircraft or other moving bodies subject to rolling or pitching motion or both.

The invention is to be limited only by the scope of the appended claims.

What is claimed is:

1. For use with a vessel subject to angular motion, a gyro stable element including a gravity reference, a gyro, and an erecting couple between said gravity reference and gyro to maintain said gravity reference and gyro in alignment during said motion, means producing an alternating voltage having a period equal to that of said angular motion and of a magnitude depending on the angular velocity of said motion, a differentiating circuit for said voltage for producing a voltage depending on the angular acceleration of said motion, means responsive to the magnitude of said differentiated voltage to disconnect said couple when said differentiated voltage passes beyond a predetermined value and to reconnect said couple when said differentiated voltage returns to said value.

2. For use with a vessel subject to angular motion, a gyro stable element, including gravity reference, a gyro and an erecting couple between said gravity reference and gyro to maintain said gyro and gravity reference in alignment during said motion, means producing an alternating voltage having a period equal to that of the angular motion of said vessel and a magnitude depending on the angular velocity of said motion, means for smoothing said alternating voltage, a differentiating circuit for said voltage producing a voltage depending on the angular acceleration of said motion, a vibrator of a fixed frequency in the output of said differentiating circuit to provide an interrupted path for said differentiated voltage to produce at its output an alternating voltage of said fixed frequency and of an amplitude from peak to peak substantially equal to said differentiated voltage, an amplifier for said last mentioned alternating voltage, a circuit including an electron tube biased substantially to cut-off to produce a direct current depending on the magnitude of said last mentioned alternating voltage, a relay operative when said current passes beyond a predetermined value to disconnect said erecting couple and further operative to again connect said erecting couple when said current returns to said value.

3. In combination with a gyro stable element adapted to be installed in a vessel, said gyro stable element including a gravity reference, a gyro and an erecting couple connected between said gravity reference and said gyro to maintain said gyro and gravity reference in alignment during angular motion of said vessel, a circuit comprising a source of alternating voltage having a period equal to that of the angular motion of said vessel and a magnitude depending on the angular velocity of said motion, a differentiating circuit responsive to said voltage and producing a second voltage that is a function of the angular acceleration of said motion, a low pass filter coupling said source to said differentiating circuit, a vibrator of a fixed frequency coupled to the output of said differentiating circuit to provide an interrupted path for said second voltage, the output of said vibrator being a third voltage having a frequency equal to said fixed frequency of said vibrator and an amplitude proportional to the amplitude of said second voltage, an amplifier for said third voltage coupled to said vibrator, a circuit including an electron tube biased substantially to cut-off, said electron tube including a grid coupled to said amplifier, a relay connected in the anode circuit of said electron tube, the magnitude of the operating current through said relay being proportional to the magnitude of said third voltage, said relay being operatively associated with said erecting couple, said relay being operative to deactivate said erecting couple when said operating current exceeds a predetermined value and to reactivate said erecting couple when said current returns to said predetermined value.

References Cited in the file of this patent
UNITED STATES PATENTS

| | | |
|---|---|---|
| 2,133,489 | Smith | Oct. 18, 1938 |
| 2,384,761 | Mehan | Sept. 11, 1945 |
| 2,411,087 | Ford | Nov. 12, 1946 |
| 2,417,573 | Strother | Mar. 18, 1947 |
| 2,419,063 | Fischer | Apr. 15, 1947 |

FOREIGN PATENTS

| | | |
|---|---|---|
| 492,670 | Great Britain | Sept. 23, 1938 |